United States Patent
Sawamura et al.

(10) Patent No.: US 9,537,431 B2
(45) Date of Patent: Jan. 3, 2017

(54) BRAKE DIAGNOSIS DEVICE AND BRAKE DIAGNOSIS METHOD

(71) Applicant: KABUSHIKI KAISHA YASKAWA DENKI, Kitakyushu-shi (JP)

(72) Inventors: Mitsujiro Sawamura, Kitakyushu (JP); Junichi Watanabe, Kitakyushu (JP); Daichi Horimai, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 14/952,841

(22) Filed: Nov. 25, 2015

(65) Prior Publication Data

US 2016/0156288 A1  Jun. 2, 2016

(30) Foreign Application Priority Data

Nov. 28, 2014 (JP) ................. 2014-242472

(51) Int. Cl.
*H02K 7/10* (2006.01)
*H02P 3/04* (2006.01)
(Continued)

(52) U.S. Cl.
CPC ............. *H02P 3/04* (2013.01); *B25J 9/1674* (2013.01); *B25J 19/0004* (2013.01); *B25J 19/06* (2013.01);
(Continued)

(58) Field of Classification Search
CPC ........ B60T 7/107; B60T 13/741; F16D 65/18; F16D 2121/14; F16D 2127/06
See application file for complete search history.

(56) References Cited

U.S. PATENT DOCUMENTS 4,578,754 A * 3/1986 Sahasrabudhe ......... B61L 3/008
246/182 B
5,927,408 A * 7/1999 Dummer ............... E21B 19/083
173/1
(Continued)

FOREIGN PATENT DOCUMENTS

EP  1503261  2/2005
JP  06-246674  9/1994
(Continued)

OTHER PUBLICATIONS

Translation of JP2005254410 has been attached.*
Extended European Search Report for corresponding EP Application No. 15196207.3-1557, Apr. 20, 2016.
Japanese Office Action for corresponding JP Application No. 2014-242472, Aug. 31, 2016 (w/ English machine translation).

*Primary Examiner* — Shawki S Ismail
*Assistant Examiner* — Zoheb Imtiaz
(74) *Attorney, Agent, or Firm* — Mori & Ward, LLP

(57) ABSTRACT

This disclosure discloses a brake diagnosis device configured to diagnose a brake of a motor with a brake. The brake diagnosis device includes a brake control part, a diagnosis part, and a signal output part. The brake control part is configured to actuate or release the brake. The diagnosis part is configured to diagnose a presence or absence of an abnormality of the brake while the brake is actuated by the brake control part. The signal output part is configured to output a signal related to a brake abnormality after the brake is released by the brake control part in a case that the diagnosis part diagnoses the brake as having an abnormality.

11 Claims, 9 Drawing Sheets

(51) Int. Cl.
  *B25J 9/16* (2006.01)
  *B25J 19/00* (2006.01)
  *B25J 19/06* (2006.01)
  *F16D 66/00* (2006.01)
  *G01L 5/28* (2006.01)
  *G05B 19/406* (2006.01)
  *H02P 3/00* (2006.01)
  *F16D 59/02* (2006.01)
  *F16D 55/00* (2006.01)
  *F16D 121/22* (2012.01)

(52) U.S. Cl.
  CPC ............... *F16D 59/02* (2013.01); *F16D 66/00* (2013.01); *G01L 5/28* (2013.01); *G05B 19/406* (2013.01); *H02P 3/00* (2013.01); *F16D 2055/0058* (2013.01); *F16D 2066/003* (2013.01); *F16D 2121/22* (2013.01)

(56) References Cited

U.S. PATENT DOCUMENTS

2007/0066445 A1*  3/2007  Kobayashi ............... F16H 61/12
                                                                477/125
2014/0000355 A1    1/2014  Shikagawa et al.
2016/0099116 A1*  4/2016  Yang ....................... H01G 11/86
                                                                264/406

FOREIGN PATENT DOCUMENTS

| JP | 2003-032879 | | 1/2003 |
| JP | 2005-254410 | | 9/2005 |
| JP | 2006-155199 | | 6/2006 |
| JP | 2005254410 | * | 9/2009 |
| JP | 2014-010546 | | 1/2014 |

* cited by examiner

WHEN BRAKE IS NORMAL

BRAKE DIAGNOSIS DEVICE AND BRAKE DIAGNOSIS METHOD

CROSS-REFERENCE TO RELATED APPLICATION

The present application claims priority from Japanese Patent Application No. 2014-242472, which was filed on Nov. 28, 2014, the disclosure of which is incorporated herein by reference in its entirety.

TECHNICAL FIELD

A disclosed embodiment relates to a brake diagnosis device and a brake diagnosis method.

BACKGROUND

A brake abnormality detection method for an industrial robot having an electromagnetic brake for a drive motor of each shaft is known.

SUMMARY

According to one aspect of the disclosure, there is provided a brake diagnosis device configured to diagnose a brake of a motor with a brake. The brake diagnosis device includes a brake control part, a diagnosis part, and a signal output part. The brake control part is configured to actuate or release the brake. The diagnosis part is configured to diagnose a presence or absence of an abnormality of the brake while the brake is actuated by the brake control part. The signal output part is configured to output a signal related to a brake abnormality after the brake is released by the brake control part in a case that the diagnosis part diagnoses the brake as having an abnormality.

DESCRIPTION OF THE EMBODIMENTS

An embodiment will now be described with reference to the drawings. Although directions such as up, down, left, and right may be used as needed for the convenience of description of configurations of a motor etc. in the following description, the positional relation of the configurations of the motor etc. is not limited thereto.

1. Configuration of Robot System

First, an example of a robot system related to this embodiment will be described with reference to FIGS. 1 to 3.

Figure 1:
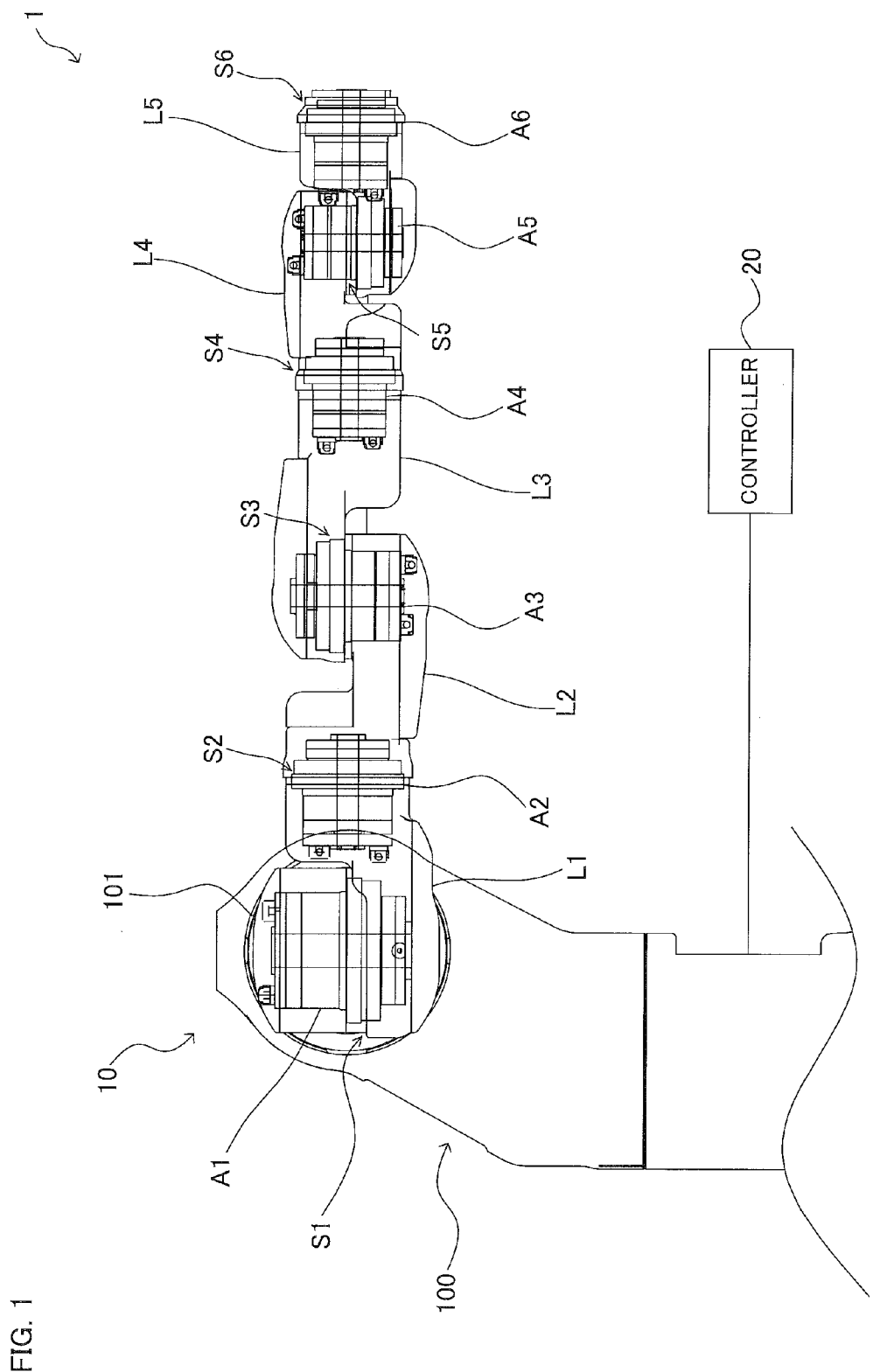
FIG. 1 is a system configuration view of an example of a robot system.

In FIG. 1, a robot system 1 has a robot 10 including an arm 100, and a controller 20 controlling this robot 10. As shown in FIG. 3, the controller 20 has a plurality of motor control devices 14 corresponding to respective motors. The robot 10 and the controller 20 are connected via a cable to enable intercommunication. The controller 20 may be disposed on the robot 10 side, such as in the arm 100 portion of the robot 10, for example.

The arm 100 of the robot 10 has a fixed portion 101, a plurality of (in this example, five) link members L1-L5, a plurality of (in this example, six) joint mechanisms S1-S6, and actuators A1-A6. The joint mechanisms S1-S6 bendably couples the link member L1 located closest to a base end of the arm 100 out of the five link members L1-L5 to the fixed portion 101 as well as the adjacent link members of the five link members L1-L5 to each other. The actuators A1-A6 are respectively disposed on the six joint mechanisms S1-S6 to generate a drive force to the link members L1-L5 to be driven.

Figure 2:
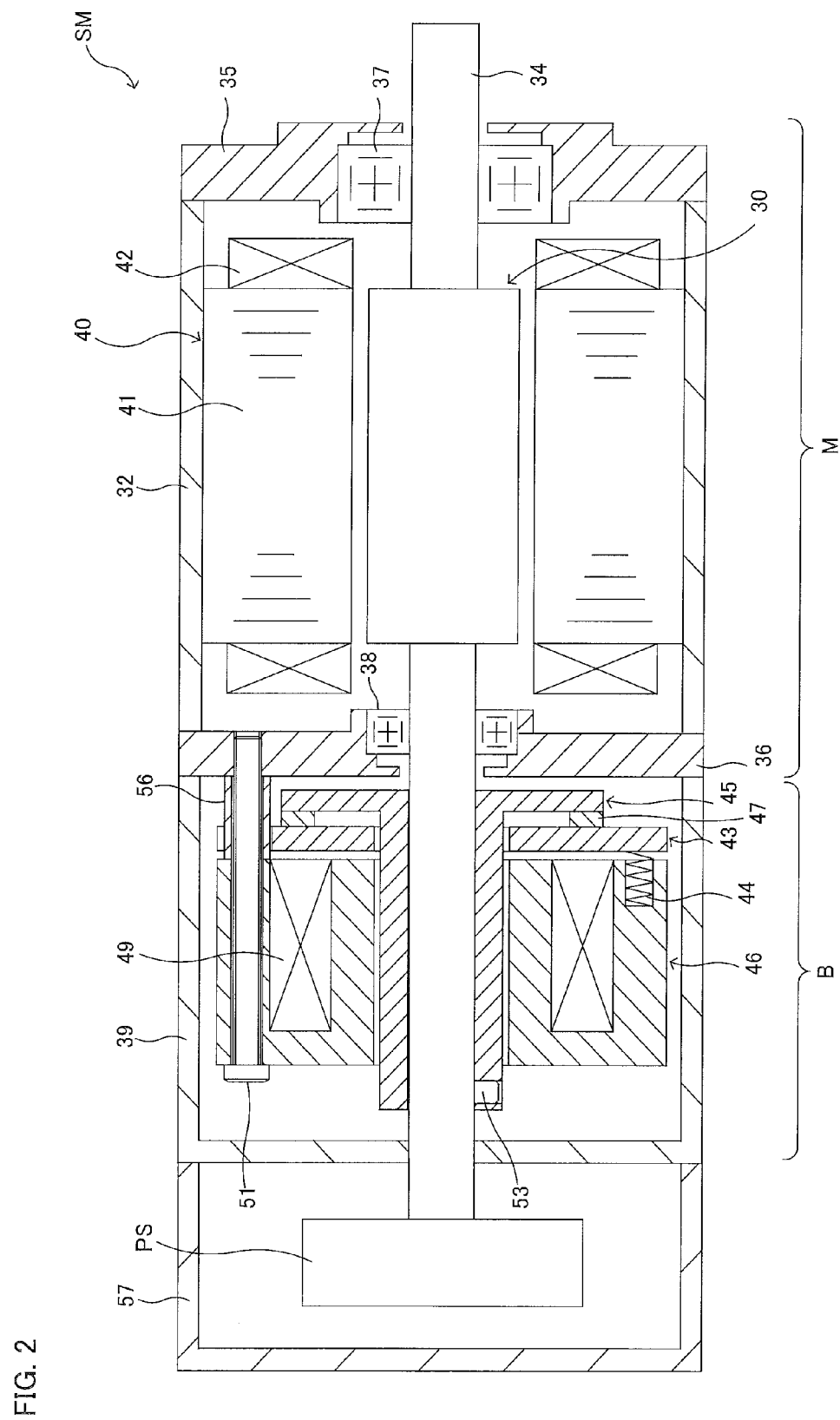
FIG. 2 is an axial cross-sectional view of an example of a general configuration of a servomotor.
Figure 3:
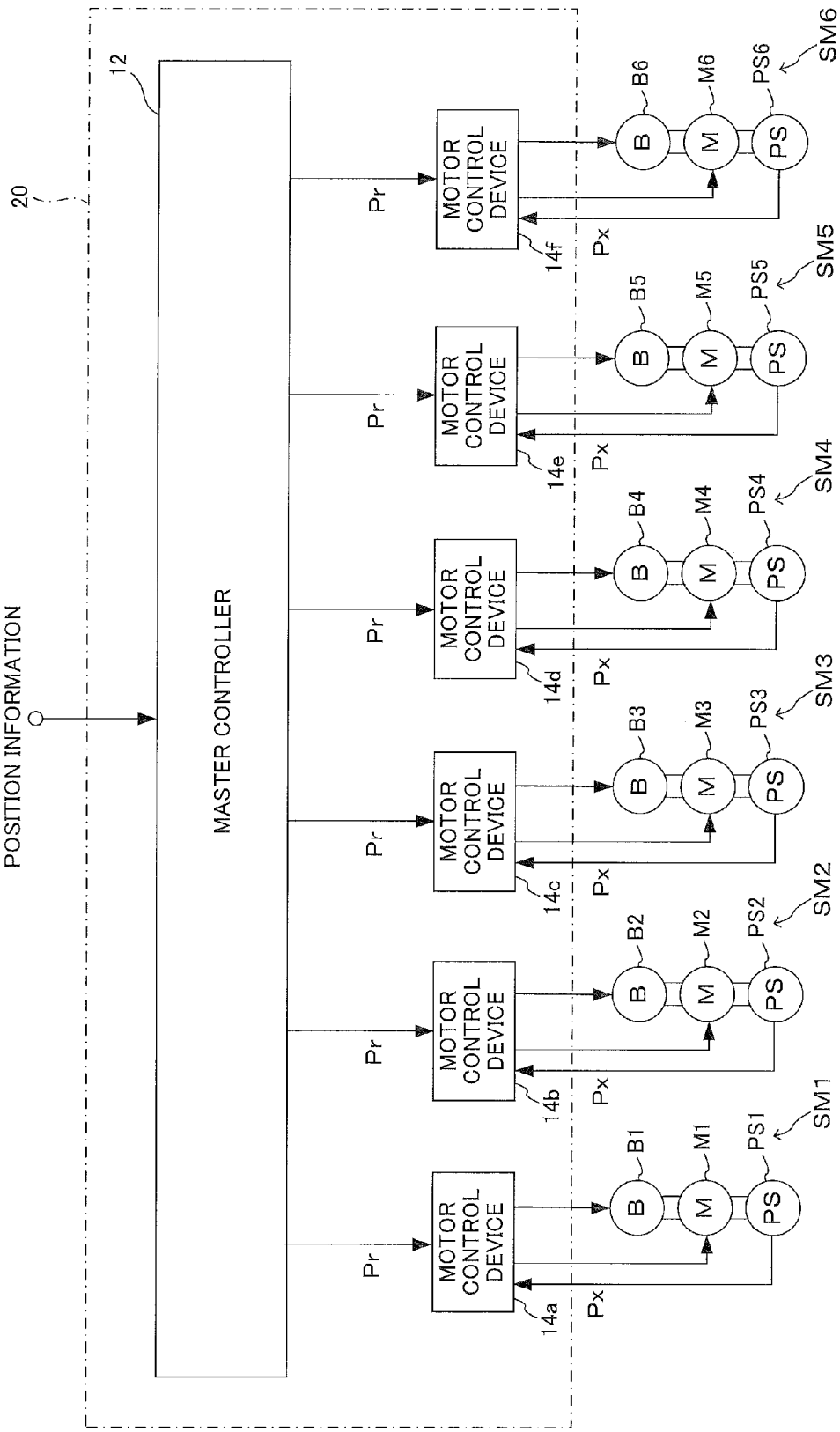
FIG. 3 is a block diagram of an example of a configuration of a controller having a motor control device.

As shown in FIGS. 2 and 3, the actuators A1-A6 include respective servomotors SM1-SM6. The servomotors SM1 to SM6 (hereinafter collectively referred to as the "servomotor SM" as needed) respectively include motors M1-M6 (hereinafter collectively referred to as the "motor M" as needed), position detectors PS1-PS6 (hereinafter collectively referred to as the "position detector PS" as needed), and brakes B1-B6 (hereinafter collectively referred to as the "brake B" as needed). The position detectors PS1-PS6 detect motor positions x (such as rotation angles) of the motors M1-M6. Detected detection positions Px of the motors M are output from the position detectors PS as feedback signals to the motor control devices 14 in each predetermined calculation period.

Vertical shafts (including inclined shafts) or shafts subjected to external force included in the robot allow a movable portion (such as a work piece) to move when a servo power source of the servomotor SM is interrupted due to the effect of the gravity or external force. Therefore, the servomotors SM with the brakes B are used for the actuators A1-A6 for the purpose of holding and preventing the movable portion from moving.

As shown in FIG. 2, each of the motors M includes a stator 40 and a rotor 30. The stators 40 and the rotors 30 of the motors M are coupled with the fixed portion 101 and the link members L1-L5 in the following relation. Specifically, the stator 40 of the motor M included in the actuator A1 is coupled to the fixed portion 101, and the rotor 30 of the motor M included in the actuator A1 is coupled to the link member L1. The stator 40 of the motor M included in the actuator A2 is coupled to the link member L1 located on the base end side of the arm 100, and the rotor 30 of the motor M included in the actuator A2 is coupled to the link member L2 located on the tip end side of the arm 100. Similarly, the stator 40 of the motor M included in the actuator A3 is coupled to the link member L2, and the rotor 30 of the motor M included in the actuator A3 is coupled to the link member L3. The stator 40 of the motor M included in the actuator A4 is coupled to the link member L3, and the rotor 30 of the motor M included in the actuator A4 is coupled to the link member L4. The stator 40 of the motor M included in the actuator A5 is coupled to the link member L4, and the rotor 30 of the motor M included in the actuator A5 is coupled to the link member L5. The stator 40 of the motor M included in the actuator A6 is coupled to the link member L5, and the rotor 30 of the motor M included in the actuator A6 is coupled to a tool, a hand, etc. (not shown) attached to a tip end of the arm 100.

In this embodiment, by way of example, description will be made of the case that a brake diagnosis device diagnoses a state of a brake such as a presence or absence of an abnormality of the brake B of the servomotor SM used in the robot 10. However, the brake diagnosis device can give a diagnosis in the same way for a brake of a motor other than the robot, for example, a motor of a machine tool.

2. Configuration of Servomotor

An example of a configuration of the servomotor SM will be described with reference to FIG. 2. In the following description, a "load side" refers to a direction of attachment of a load to the servomotor SM, i.e., a direction of protrusion of a shaft 34 (the right side of FIG. 2) in this example, and an "opposite load side" refers to the direction opposite to the load side (the left side of FIG. 2).

The servomotor SM corresponds to an example of a motor with a brake. As shown in FIG. 2, the servomotor SM has the motor outputting a rotation force, the brake B, and the position detector PS such as an encoder. The motor M includes the shaft 34, a frame 32, a load-side bracket 35 disposed on a load-side end portion of the frame 32, and an opposite-load-side bracket 36 disposed on an opposite-load-side end portion of the frame 32. The load-side bracket 35 and the opposite-load-side bracket 36 include a load-side bearing 37 and an opposite-load-side bearing 38, respectively. The shaft 34 is rotatably supported via the load-side bearing 37 and the opposite-load-side bearing 38.

The motor M has the rotator 30 disposed on the shaft 34 and the stator 40 disposed on an inner circumferential surface of the frame 32. The rotator 30 has, for example, a plurality of permanent magnets (not shown). The stator 40 includes a stator iron core 41 arranged in an annular shape and a plurality of armature windings 42 wound around a plurality of teeth not shown of the stator iron core 41.

The brake B is disposed on the opposite load side of the motor M for stop-holding or braking of the shaft 34. The brake B may be disposed on the load side of the motor M. The brake B is covered with a brake cover 39. The brake B has a cylindrical field core 46, an annular armature 43 disposed facing the load side of the field core 46, and a brake disk 45 disposed between the armature 43 and the opposite-load-side bracket 36.

The field core 46 is fixed to the opposite-load-side bracket 36 by a bolt 51. The field core 46 includes a plurality of braking springs 44. The braking springs 44 presses and urges the armature 43 toward the load side. The field core 46 includes a coil 49. The coil 49 generates a magnetic attraction force when being energized and attracts the armature 43 toward the opposite load side against the urging force of the braking springs 44. The armature 43 includes a magnetic body (such as a steel plate).

A plurality of collars 56 is disposed between the field core 46 and the opposite-load-side bracket 36. The collars 56 engage with the armature 43 to prevent circumferential rotation of the armature 43 while allowing axial movement thereof.

The brake disk 45 is fixed to the shaft 34 by a fixing screw 53. An annular friction plate 47 is attached to a surface of the brake disk 45 on the opposite load side.

While the coil 49 of the brake B is not energized (in a non-excitation state), the armature 43 is pressed toward the load side by the spring force of the braking springs 44 and frictionally engages with the brake disk 45. As a result, the stop-holding or the braking of rotation of the shaft 34 is achieved when the power source is interrupted. This state is the actuated state of the brake B. On the other hand, while the coil 49 is energized (in an excitation state), the armature 43 is moved by the magnetic attraction force due to the coil 49 toward the opposition load side. As a result, the brake disk 45 is released from the braking when the motor M is operated, and the shaft 34 becomes rotatable. This state is the released state of the brake B.

The position detector PS is disposed on the opposite load side of the brake B and is coupled to the shaft 34. The position detector PS may be disposed on other than this position, for example, between the motor M and the brake B. The position detector PS detects a rotational position (such as rotation angle) of the shaft 34 to detect a motor position x (such as rotation angle) of the motor M and outputs data of the detection position Px.

The position detector PS may detect at least one of the speed (such as rotation speed, angular speed) of the motor M and the acceleration (such as rotation acceleration, angular acceleration) of the motor M, in addition to or instead of the motor position x of the motor M.

Although the configuration and the operation of the electromagnetic brake B have been described, the configuration of the brake B is not limited to this example. For example, the brake B is not limited to the electromagnetic type and may be a brake of another drive system such as a mechanical type and a hydraulic type.

3. Configuration of Controller

An examples of configuration and function of the controller 20 will be described with reference to FIG. 3.

As shown in FIG. 3, the controller 20 has a master controller 12 and motor control devices 14a, 14b, 14c, 14d, 14e, 14f (hereinafter collectively referred to as the "motor control device 14" as needed) disposed in accordance with the servomotors SM1-SM6.

The master controller 12 includes, for example, a computer such as a general-purpose personal computer, a PLC (programmable logic controller), and a motion controller. The master controller 12 generates a position command Pr for each of the motors M1-M6 based on a work procedure (e.g., input as position information) executed by the robot 10. The generated position commands Pr for the motors M1-M6 are output to the corresponding motor control devices 14a-14f.

The motor control devices 14a-14f control the drive of the corresponding motors M1-M6 based on the position commands Pr input from the master controller 12 and the detection positions Px of the motors M1-M6 detected by the position detectors PS1-PS6.

4. Motor Control Device

An example of a functional configuration of the motor control device 14 will be described with reference to FIG. 4.

Figure 4:
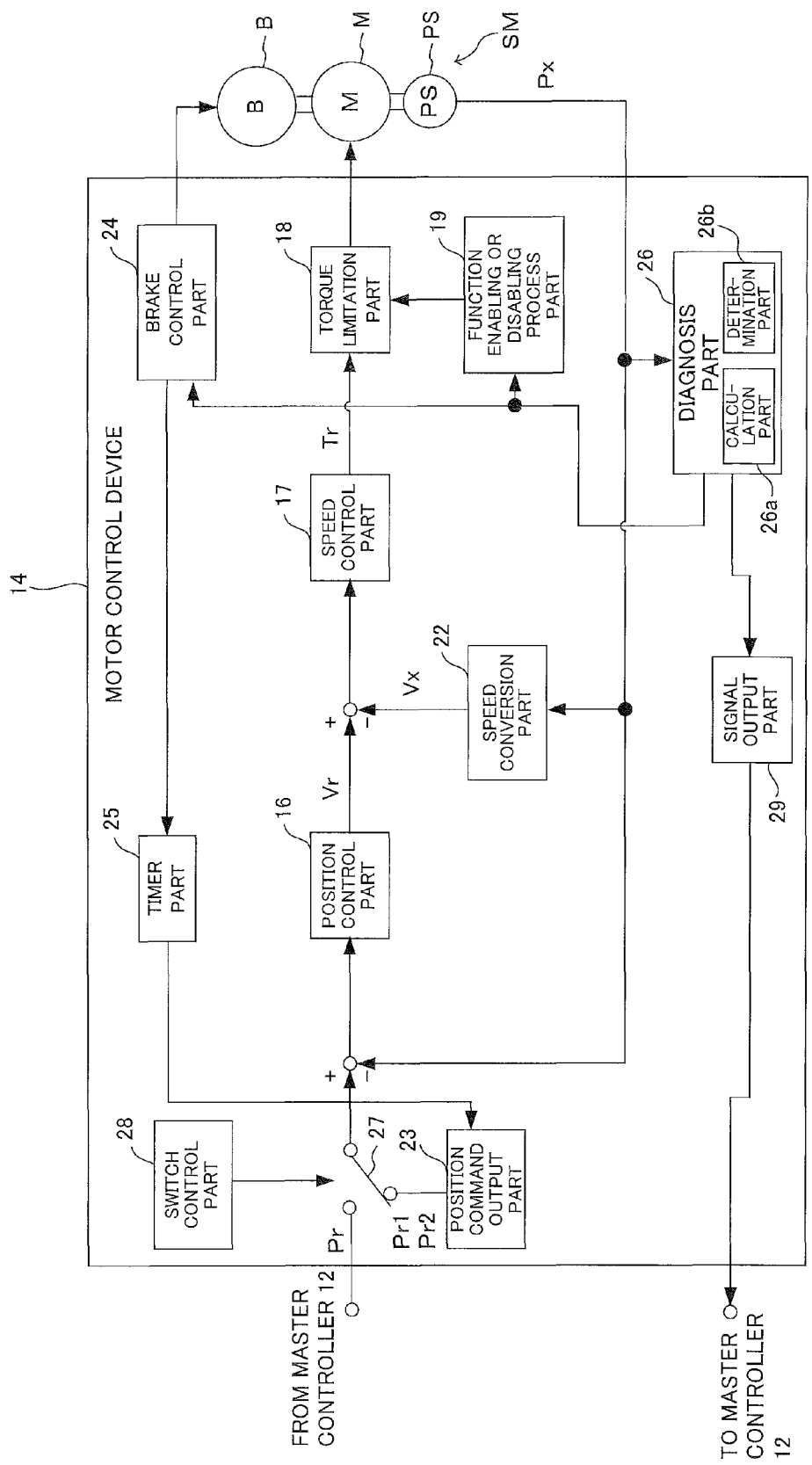
FIG. 4 is a block diagram of an example of a functional configuration of the motor control device.

As shown in FIG. 4, the motor control device 14 has a position control part 16, a speed control part 17, a torque limitation part 18, a function enabling or disabling process part 19, a speed conversion part 22, a position command output part 23, a brake control part 24, a timer part 25, a diagnosis part 26, a switch 27, a switch control part 28, and a signal output part 29.

The switch 27 can switch the connection to the position control part 16 between the master controller 12 side and the position command output part 23 side under the control of the switch control part 28. The switch control part 28 switches the switch 27 to connect the position control part 16 and the master controller 12 during normal operation of the robot 10 and switches the switch 27 to connect the position control part 16 and the position command output part 23 at the time of brake diagnosis of the motor M.

The position control part 16 generates a velocity command Vr based on a deviation between the position command Pr output from the master controller 12 or a first position command Pr1 (or a second position command Pr2) output from the position command output part 23 and the detection position Px of the motor M output from the position detector PS and outputs the velocity command Vr to the speed control part 17.

The speed conversion part 22 calculates the motor speed (rotation speed) of the motor M by, for example, a differential operation, based on a change in the detection position Px of the motor M output from the position detector PS and outputs the motor speed as a detection velocity Vx to the speed control part 17.

The speed control part 17 generates a torque command Tr based on a deviation between the velocity command Vr output from the position control part 16 and the detection velocity Vx of the motor M output from the speed conversion part 22 and outputs the torque command Tr to the torque limitation part 18.

In the case that the position command output part 23 starts outputting the first position command Pr1, the torque limitation part 18 starts torque limitation for limiting the command torque of the torque command Tr input from the speed control part 17 to a torque limitation value TL or less. In the case that the position command output part 23 stops outputting the first position command Pr1, the torque limitation part 18 cancels the torque limitation. The torque limitation function of the torque limitation part 18 is switched by the function enabling or disabling process part 19 between enabled and disabled. The torque limitation value TL is set as a parameter to an arbitrary value.

The brake control part 24 actuates or releases the brake B. Specifically, the brake control part 24 actuates the brake B at the start of diagnosis and releases the brake B when a constant time t3 (see FIG. 5 described later) has elapsed from the start of the output of the first position command Pr1 by the position command output part 23 or when the diagnosis part 26 diagnoses that the brake B has an abnormality before the elapse of the constant time t3.

The timer part 25 counts a time elapsed from the time point of actuation of the brake B by the brake control part 24 and outputs the counted elapsed time (or may output a signal indicative of completion of counting of a predetermined time) to the position command output part 23. The timer part 25 counts a time elapsed from the time point of release of the brake B by the brake control part 24 and outputs the counted elapsed time (or may output a signal indicative of completion of counting of a predetermined time) to the position command output part 23.

The diagnosis part 26 diagnoses the presence or absence of an abnormality of the brake B while the brake B is actuated by the brake control part 24. The "abnormality of the brake" in this case refers to a state in which the braking torque of the brake B is reduced lower than a desired value (determined in accordance with a model, performance, etc., of the brake B) due to wear of the friction plate 47. The diagnosis part 26 has a calculation part 26a and a determination part 26b. The calculation part 26a calculates a movement amount P1 of a motor position from a diagnosis start position based on the detection position Px of the motor M input from the position detector PS. The determination part 26b compares the movement amount P1 calculated by the calculation part 26a with a predetermined threshold value Po and determines that the brake B has an abnormality, for example, in the case that the movement amount P1 is equal to or greater than the threshold value Po (P1≥Po). The determination part 26b determines that the brake B is normal without an abnormality, for example, in the case that the movement amount P1 is less than the threshold value Po (P1<Po). The diagnosis result of the diagnosis part 26 is output to the brake control part 24, the function enabling or disabling process part 19, the signal output part 29, etc.

The position command output part 23 outputs to the position control part 16 the first position command Pr1 for moving the motor position by a predetermined amount from the diagnosis start position while the brake B is actuated by the brake control part 24. The output of the first position command Pr1 by the position command output part 23 is started when the timer part 25 has counted a first waiting time t1 elapsed from the time point of actuation of the brake B. The first waiting time t1 is a time required for the actuation of the brake B and is, for example, a time required for the armature 43 to move and frictionally engage with the brake disk 45 in the brake B. Unless the diagnosis part 26 diagnoses that the brake B has an abnormality, the position command output part 23 outputs the first position command Pr1 only for the preset constant time t3 from the start of output and stops the output of the first position command Pr1 after the elapse of the constant time t3.

In the case that the diagnosis part 26 diagnoses the brake B as having an abnormality during output of the first position command Pr1 (i.e., before the constant time t3 has elapsed), the position command output part 23 stops the output of the first position command Pr1 at this time point. In the case that the output of the first position command Pr1 is stopped, the position command output part 23 outputs to the position control part 16 a second position command Pr2 for returning the motor position to the diagnosis start position after the brake B is released by the brake control part 24. The output of the second position command Pr2 by the position command output part 23 is started when the timer part 25 has counted a second waiting time t2 elapsed from the time point of release of the brake B. The second waiting time t2 is a time required for the release of the brake B and is, for example, a time required for the armature 43 to move to release the brake disk 45 in the brake B.

In the case that the diagnosis part 26 diagnoses the brake B as having an abnormality, the signal output part 29 outputs to the master controller 12 a signal related to a brake abnormality after the brake B is released by the brake control part 24, specifically, when the detection position Px of the motor M reaches the diagnosis start position. A type of the signal related to a brake abnormality is not particularly limited and is, for example, a warning signal or an alarm signal.

As described above, the motor control device 14 in this embodiment has functions (processing parts) related to the abnormality diagnosis of the brake B. Therefore, the motor control device 14 corresponds to an example of the brake diagnosis device. It is noted that, for example, the master controller 12 may have the respective functions (processing parts) related to the brake diagnosis for the brakes B of the servomotors SM. In this case, the master controller 12 corresponds to an example of the brake diagnosis device.

The brake control part 24 corresponds to an example of means of actuating a brake of a motor with the brake and means of releasing the brake in the case that the brake is diagnosed as having an abnormality, and the diagnosis part 26 corresponds to an example of means of diagnosing presence or absence of an abnormality of the brake in an actuated state of the brake.

The processes etc. in the brake control part 24, the diagnosis part 26, etc. shown in FIG. 4 are not limited to the example of allocation of these processes and, for example, the processes may be executed by a fewer number of processing parts (e.g., one processing part) or may be executed by more finely divided processing parts. The motor control device 14 may have a part (such as an inverter) supplying drive electric power to the motor M only implemented by an actual device and other functions implemented by a program executed by a CPU 901 (see FIG. 9) described later, or may have the brake control part 24, the diagnosis part 26, etc. partially or entirely implemented by actual devices such as ASIC, FPGA, and other electric circuits.

5. Time Chart of Brake Diagnosis Operation

Figure 5:
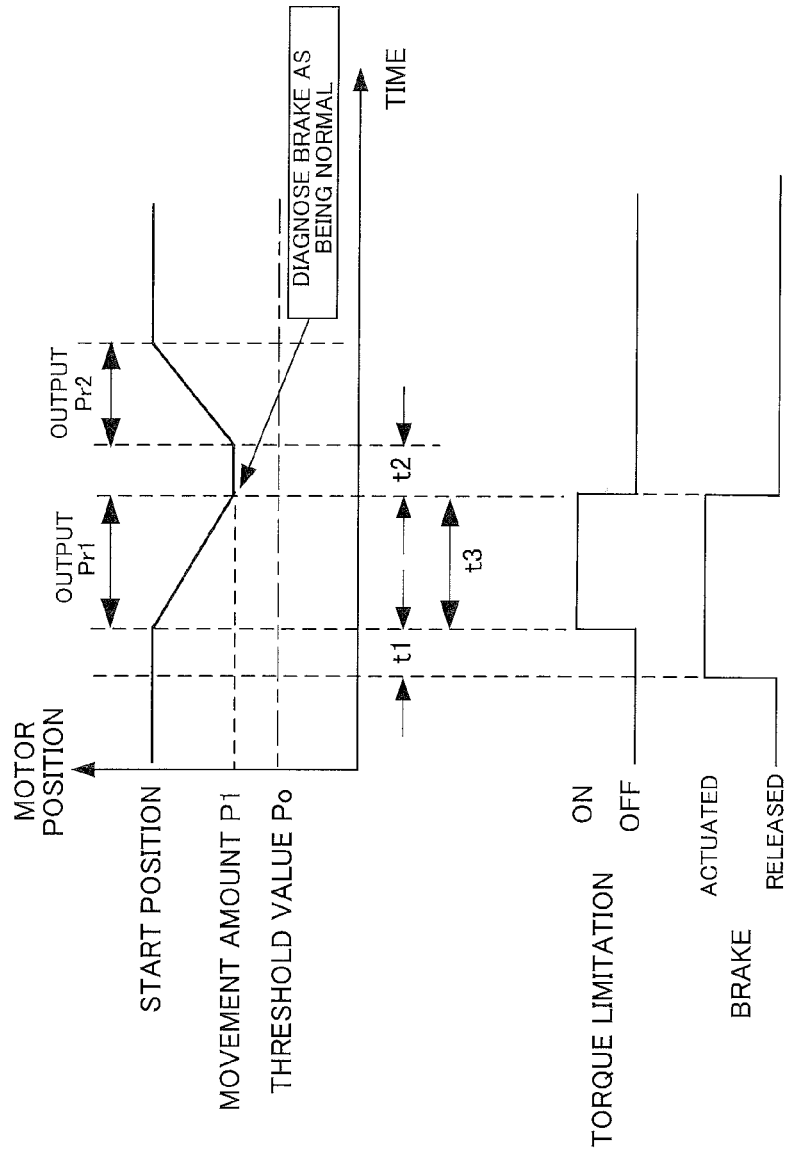
FIG. 5 is a time chart of an example of operation at the time of brake diagnosis when a brake is normal.

Description will be made of an example of a time chart of a diagnosis operation at the time of diagnosis of the presence or absence of an abnormality of the brake B with reference to FIGS. 5 and 6.

5-1. In the Case of Normal Brake

An example of the time chart in the case of the normal brake B will be described with reference to FIG. 5.

The brake diagnosis is performed at the time of setup or maintenance and inspection of the robot system 1, for example. While a robot power source and a servomotor power source are turned on, the position control part 16 and the position command output part 23 are connected by switching of the switch 27 by the switch control part 28 to start the diagnosis of the brake B by the motor control device 14.

First, the brake control part 24 actuates the brake B. In this case, the timer part 25 counts a time elapsed from the time point of actuation of the brake B (e.g., the time point when the brake control part 24 outputs an actuation signal to the brake B).

When the timer part 25 has counted the first waiting time t1 elapsed from the time point of actuation of the brake B, the position command output part 23 starts outputting the first position command Pr1 (the command for moving the motor position x by a predetermined amount from the diagnosis start position) to the position control part 16. The output of the first position command Pr1 is stopped when the constant time t3 has elapsed.

When a deviation between the first position command Pr1 and the detection positions Px from the position detector PS is input to the position control part 16, the position control part 16 generates the velocity command Yr. When a deviation between the velocity command Vr and the detection velocity Vx output from the speed conversion part 22 is input to the speed control part 17, the speed control part 17 generates and outputs the torque command Tr to the torque limitation part 18.

At the same time as the start of output of the first position command Pr1 by the position command output part 23, the torque limitation part 18 starts the torque limitation for limiting the command torque of the torque command Tr output from the speed control part 17 to the torque limitation value TL or less. As a result, while a constant torque corresponding to the torque limitation value TL is applied to the motor M, the motor M is operated through the position control using the first position command Pr1.

During the operation of the motor M through the position control, the calculation part 26a of the diagnosis part 26 calculates the movement amount P1 of the motor position x from the diagnosis start position based on the detection position Px input from the position detector PS. The determination part 26b compares the calculated movement amount P1 with the threshold value Po and determines the presence or absence of an abnormality of the brake B based on whether the movement amount P1 reaches the threshold value Po. In the example shown in FIG. 5, the movement amount P1 from the start of output of the first position command Pr1 until the elapse of the constant time t3 is less than the threshold value Po and it is therefore diagnosed that the brake B is normal without abnormality.

The diagnosis part 26 outputs the diagnosis result to the brake control part 24 and the function enabling or disabling process part 19. As a result, the brake control part 24 releases the brake B and the torque limitation part 18 cancels the torque limitation.

When the brake control part 24 releases the brake B, the timer part 25 counts a time elapsed from the time point of release of the brake B (e.g., the time point when the brake control part 24 outputs a release signal to the brake B). When the timer part 25 has counted the second waiting time t2 elapsed from the time point of release of the brake B, the position command output part 23 starts outputting the second position command Pr2 for returning the motor position x to the diagnosis start position. As a result, the motor position x reaches and returns to the diagnosis start position.

Subsequently, the switch control part 28 switches the switch 27 to connect the position control part 16 and the master controller 12. As a result, the motor M can be shifted to normal operation to shift the robot 10, a machine tool, etc., to normal operation.

5-2. In the Case of Abnormal Brake

An example of the time chart in the case of the abnormal brake B will be described with reference to FIG. 6. In FIG. 6, the portions same as those of FIG. 5 will not be described.

Figure 6:
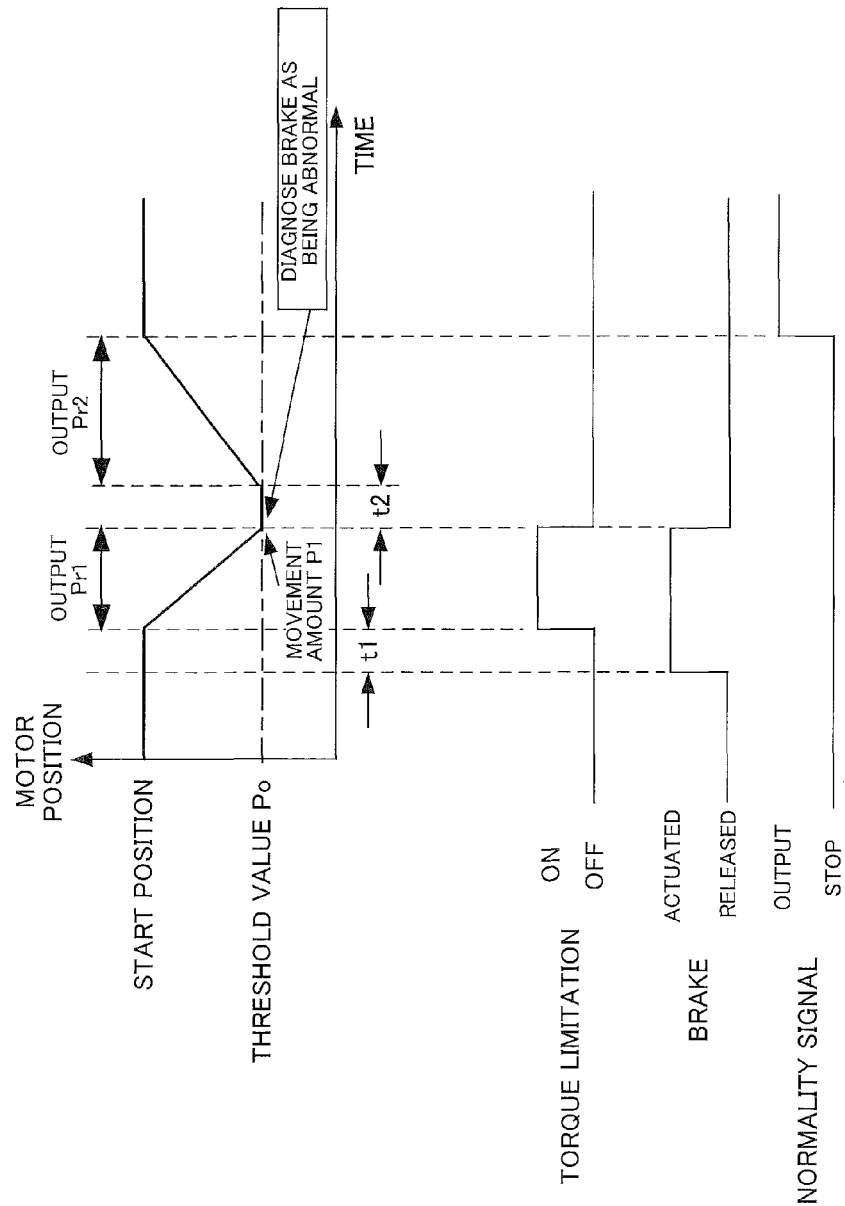
FIG. 6 is a time chart of an example of operation at the time of brake diagnosis when a brake is abnormal.

In the example of the time chart shown in FIG. 6, the movement amount P1 reaches the threshold value Po before the constant time t3 elapses from the start of output of the first position command Pr1. Therefore, the determination part 26b of the diagnosis part 26 determines that the brake B has an abnormality. The diagnosis part 26 outputs the diagnosis result to the brake control part 24 and the function enabling or disabling process part 19. As a result, the brake control part 24 releases the brake B and the torque limitation part 18 cancels the torque limitation.

After the brake control part 24 releases the brake B, when the timer part 25 has counted the second waiting time t2 elapsed from the time point of release of the brake B, the position command output part 23 starts outputting the second position command Pr2. As a result, the motor position x is returned to the diagnosis start position.

When the detection positions Px reaches the diagnosis start position due to the second position command Pr2 from the position command output part 23, the signal output part 29 outputs a signal related to a brake abnormality. Therefore, the signal output part 29 outputs the signal related to a brake abnormality after the brake control part 24 releases the brake B.

Subsequently, the switch control part 28 switches the switch 27 to connect the position control part 16 and the master controller 12. As a result, the motor M can be shifted to normal operation to shift the robot 10, a machine tool, etc., to normal operation.

The switch control part 28 and the switch 27 correspond to an example of means of shifting the motor with the brake to normal operation after release of the brake.

The portions of the diagnosis operation at the time of an abnormal brake other than the above description are the same as the diagnosis operation at the time of a normal brake and therefore will not be described.

6. Effects of Embodiment

As described above, the motor control device 14 of this embodiment has the brake control part 24 actuating or releasing the brake B, the diagnosis part 26 diagnosing presence or absence of an abnormality of the brake B while the brake B is actuated by the brake control part 24, and the signal output part 29 outputting a signal related to a brake abnormality after the brake B is released by the brake control part 24 in the case that the diagnosis part 26 diagnoses the brake B as having an abnormality. As a result, the following effects are provided.

Specifically, for example, vertical shafts and inclined shafts or horizontal shafts etc. subjected to external force in the robot 10, a machine tool, etc. may allow a movable portion (e.g., a table, a work piece) to move due to the gravity or external force when a power source is interrupted. Therefore, for the purpose of holding and preventing the movable portion from moving when a power source is interrupted, the servomotor SM with a brake may be used as in this embodiment. In this case, since the brake B is not actuated during normal operation of the robot 10, a machine tool, etc., the operation state is less affected even if the motor M with the brake B having an abnormality detected is driven as it is.

In the case that the motor M is stopped with the actuated state of the brake B retained when an abnormality is detected in the brake B, the operation of the robot 10, the machine tool, etc., is stopped, which may lead to a reduction in the operation rate.

In this embodiment, in the case that the brake B is diagnosed as having an abnormality by the diagnosis part 26, a signal related to a brake abnormality is output after the brake B is released. Since the actuated state of the brake B is released rather than retained in that case that an abnormality of the brake B is detected, the motor M can subsequently be driven to shift the robot 10, the machine tool, etc. to the normal operation. Since the signal related to a brake abnormality is output after the brake is released, the brake B is not operated, for example, when the motor control device 14 receives the position command Pr (for the normal operation) from the master controller 12 receiving the signal, and the shift to the normal operation can smoothly be made. The brake B diagnosed as being abnormal may be repaired or replaced at the time of subsequent maintenance.

In this way, a reduction in the operation rate can be suppressed as compared to the case of stopping the motor M when an abnormality is detected in the brake B as described above. Therefore, the brake abnormality of the motor M can be diagnosed while a reduction in the operation rate is suppressed.

Particularly in this embodiment, the brake control part 24 releases the brake B when the diagnosis part 26 diagnoses that the brake B has an abnormality. As a result, the motor M can be driven immediately after the diagnosis of the brake abnormality. Therefore, the shift of the robot 10, the machine tool, etc. to the normal operation can be made earlier to further suppress the reduction in the operation rate.

Particularly in this embodiment, the diagnosis part 26 has the calculation part 26a calculating the movement amount P1 of the motor position from the diagnosis start position based on the detection position Px input from the position detector PS detecting the motor position of the motor M, and the determination part 26b comparing the movement amount P1 calculated by the calculation part 26a with the threshold value Po to determining the presence or absence of an abnormality of the brake B. As a result, the threshold value Po can be set as a parameter to an arbitrary value in accordance with, for example, types of the motor M and the brake B, age of service, usage environment, a required safety factor, etc., to enable the brake diagnosis corresponding to various conditions.

Particularly in this embodiment, the motor control device 14 has the position control part 16 generating the velocity command Vr based on the first position command Pr1 and the detection positions Px, and the position command output part 23 outputting to the position control part 16 the first position command Pr1 for moving the motor position by a predetermined amount from the diagnosis start position while the brake B is actuated by the brake control part 24. As a result, the following effects are provided.

Specifically, in this embodiment, when the motor M is operated in the brake actuated state, the position control using the first position command Pr1 is provided. If the speed control or the torque control is provided during brake diagnosis, the movement amount may become excessively large in accordance with a level of deterioration of the brake B, resulting in a damage of the movable portion, runaway of the motor M, etc.; however, since the movement amount can be limited by providing the positional control, such a situation can be avoided.

Particularly in this embodiment, the motor control device 14 has the speed control part 17 generating the torque command Tr based on the velocity command Vr and the detection velocity Vx based on the detection position Px, and the torque limitation part 18 starting the torque limitation for limiting the command torque of the torque command Tr to the torque limitation value TL or less in the case that the position command output part 23 starts outputting the first position command Pr1, the torque limitation part 18 canceling the torque limitation in the case that the position command output part 23 stops outputting the first position command Pr1. As a result, the following effects are provided.

Specifically, when the motor M is operated under the position control in the brake actuated state, a positional deviation becomes larger and the torque command Tr therefore increases. Thus, by limiting the command torque Tr to the torque limitation value TL or less by the torque limitation part 18, a constant torque corresponding to the torque limitation value TL can be applied to the motor M and the proper brake diagnosis can be performed. The torque limitation value TL can be set as a parameter to an arbitrary value in accordance with, for example, types of the motor M and the brake B, age of service, usage environment, a required safety factor, etc., to enable the brake diagnosis corresponding to various conditions.

Particularly in this embodiment, the position command output part 23 stops the output of the first position command Pr1 in the case that the diagnosis part 26 diagnoses the brake B as having an abnormality during output of the first position command Pr1. As a result, the diagnosis operation of the motor M can be stopped immediately after the diagnosis of the brake abnormality. Therefore, the shift of the robot 10, the machine tool, etc. to the normal operation can be made earlier to further suppress the reduction in the operation rate.

Particularly in this embodiment, after the output of the first position command Pr1 is stopped and the brake control part 24 releases the brake B, the position command output part 23 outputs to the position control part 16 the second position command Pr2 for returning the motor position to the diagnosis start position. As a result, the following effects are provided.

Specifically, since the operation of returning the motor position to the diagnosis start position is executed after the brake diagnosis, the normal operation of the motor M can be performed immediately thereafter. Therefore, the shift of the robot 10, the machine tool, etc. to the normal operation can be made earlier to further suppress the reduction in the operation rate. Particularly, in the case that a plurality of operations is repeated in one diagnoses, a return to the diagnosis start position can automatically be achieved at the end of each operation and the diagnosis time can therefore be shortened.

Particularly in this embodiment, the signal output part 29 outputs the signal related to a brake abnormality when the detection position Px reaches the diagnosis start position. As a result, for example, when the position command Pr for the normal operation is received from the master controller 12 receiving the signal, the shift to the normal operation can smoothly be made.

Particularly in this embodiment, the motor control device 14 has the timer part 25 counting a time elapsed from the time point of actuation of the brake B by the brake control part 24, and the position command output part 23 starts outputting the first position command Pr1 when the timer part 25 has counted the elapse of the first waiting time t1. As a result, the following effects are provided.

Specifically, the actuation of the brake B requires a predetermined time for the armature 43 to move and frictionally engage with the brake disk 45. Therefore, by counting the elapse of the first waiting time t1, the reliability of the brake actuation can be improved at the time of output of the first position command Pr1.

Particularly in this embodiment, the timer part 25 counts a time elapsed from the time point of release of the brake B by the brake control part 24, and the position command output part 23 starts outputting the second position command Pr2 when the timer part 25 has counted the elapse of the second waiting time t2. As a result, the following effects are provided.

Specifically, the release of the brake B requires a predetermined time for the armature 43 to move to release the brake disk 45. Therefore, by counting the elapse of the second waiting time t2, the reliability of the brake release can be improved at the time of output of the second position command Pr2.

7. Modification Example

Figure 7:
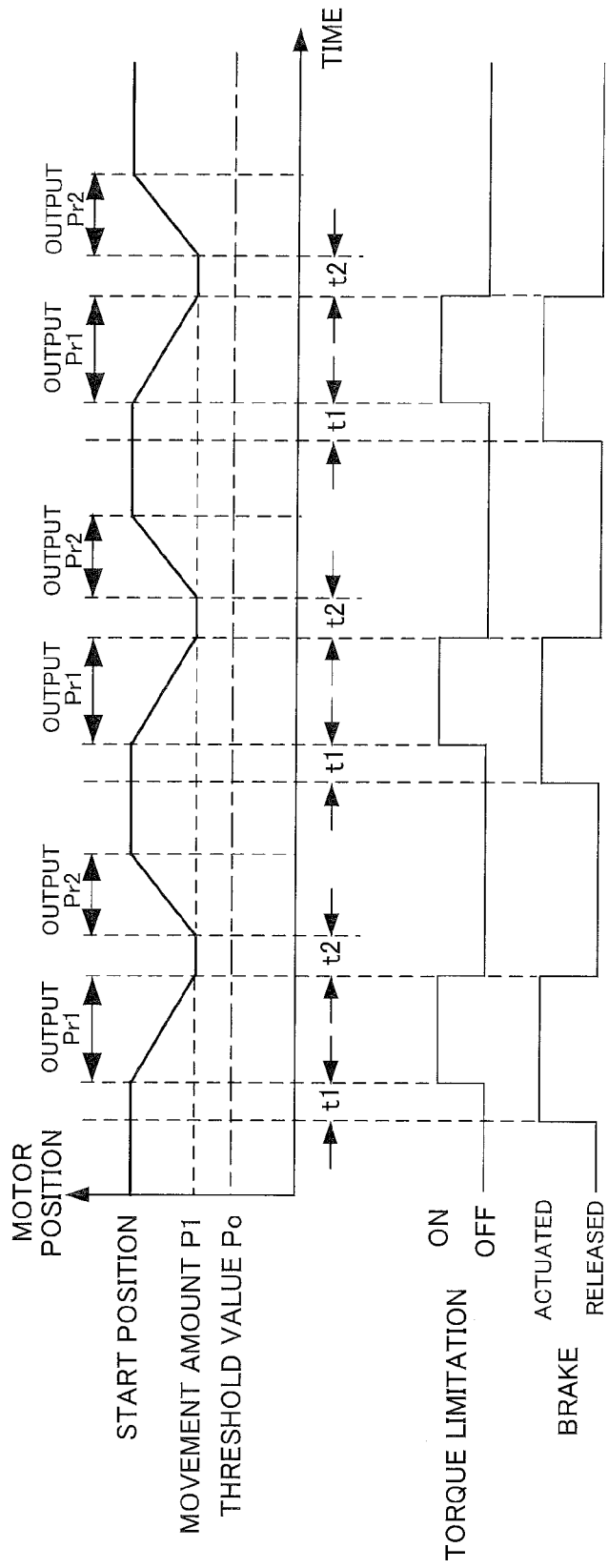
FIG. 7 is a time chart of an example of operation at the time of brake diagnosis when a brake is normal in a modification example when a plurality of diagnosis operations is performed in one diagnosis.
Figure 8:
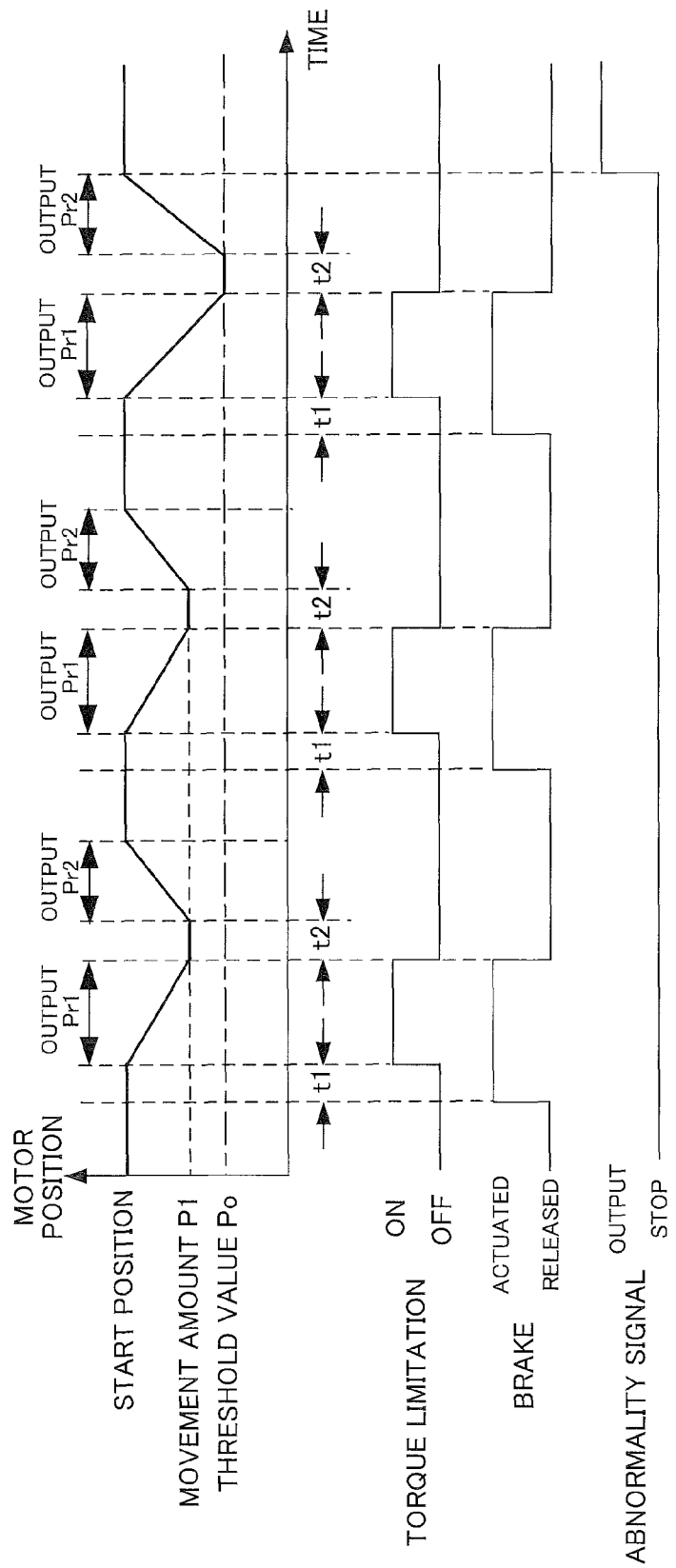
FIG. 8 is a time chart of an example of operation at the time of brake diagnosis when a brake is abnormal in the modification example when a plurality of diagnosis operations is performed in one diagnosis.

The disclosed embodiment is not limited to the above description and may variously be modified without departing from the spirit and the technical ideas thereof Although the presence or absence of an abnormality of the brake B is diagnosed by performing only one diagnosis operation of applying a constant torque in the actuated state of the brake B so as to determine a movement amount of a motor position and subsequently returning the motor position to the diagnosis start position, the presence or absence of an abnormality of the brake B may be diagnosed by repeating a plurality of diagnosis operations. FIGS. 7 and 8 show examples of time charts of this modification example.

In the example shown in FIG. 7, a series of diagnosis operations is repeated thrice. As described above, the one series of diagnosis operations is an operation including: actuating the brake B; outputting the first position command Pr1 for a constant time after waiting the elapse of the first waiting time t1; operating the motor M while a constant torque is applied; calculating the movement amount P1 of the motor position from the diagnosis start position; comparing the movement amount P1 with the threshold value Po to determine the presence or absence of a brake abnormality; stopping the output of the first position command Pr1 (stopping the output when a certain time has elapsed from the start of output of the first position command Pr1 in the case that the movement amount P1 is less than the threshold value Po, or stopping the output when the movement amount P1 reaches the threshold value Po in the case that the movement amount P1 is equal to or greater than the threshold value Po); releasing the brake B; outputting the second position command Pr2 after waiting the elapse of the second waiting time t2; and returning the motor position to the diagnosis start position.

In this modification example, the movement amount P1 of the motor M is less than the threshold value Po in all the three diagnosis operations and the brake B is therefore diagnosed as being normal.

On the other hand, in the example shown in FIG. 8, the movement amount P1 of the motor M is less than the threshold value Po in the first and second diagnosis operations out of the three diagnosis operations; however, the movement amount P1 of the motor M reaches the threshold value Po in the third diagnosis operation. In this modification example, the diagnosis part 26 diagnoses that the brake B has an abnormality in the case that P1 reaches Po in at least one diagnosis operation out of a plurality of the diagnosis operations. Therefore, the brake B is diagnosed as having an abnormality in the example shown in FIG. 8. The signal output part 29 outputs a signal related to a brake abnormality when the detection position Px of the motor M reaches the diagnosis start position in the last diagnosis operation out of a plurality of the diagnosis operations.

The number of the diagnosis operations is not limited to three and may be two or four or more. A diagnostic criterion of diagnosing a brake as having an abnormality is not limited to the case that P1 reaches Po in at least one of a plurality of the diagnosis operations. Various criteria can be employed, including the case that P1 reaches Po in all the diagnostic operations, the case that P1 reaches Po in a predetermined number of the diagnostic operations, the case that P1 reaches Po in multiple times (e.g., twice) in series, the case that P1 reaches Po in the last diagnosis operation of multiple operations, etc. The diagnosis start position may be varied for each of the repeated diagnosis operations.

According to this modification example, a plurality of diagnosis operations is performed to determine the presence or absence of an abnormality of the brake and the reliability of diagnosis can therefore be increased. Particularly, for example, in that case that a difference occurs in condition of physical contact between the armature 43 and the friction plate 47 of the brake disk 45 in the brake B in accordance with the rotation position of the motor M, an operation environment at a certain time, etc., the presence or absence of an abnormality of the brake may not correctly be diagnosable from one diagnosis operation and this modification example is therefore effective.

8. Hardware Configuration Example of Motor Control Device

Figure 9:
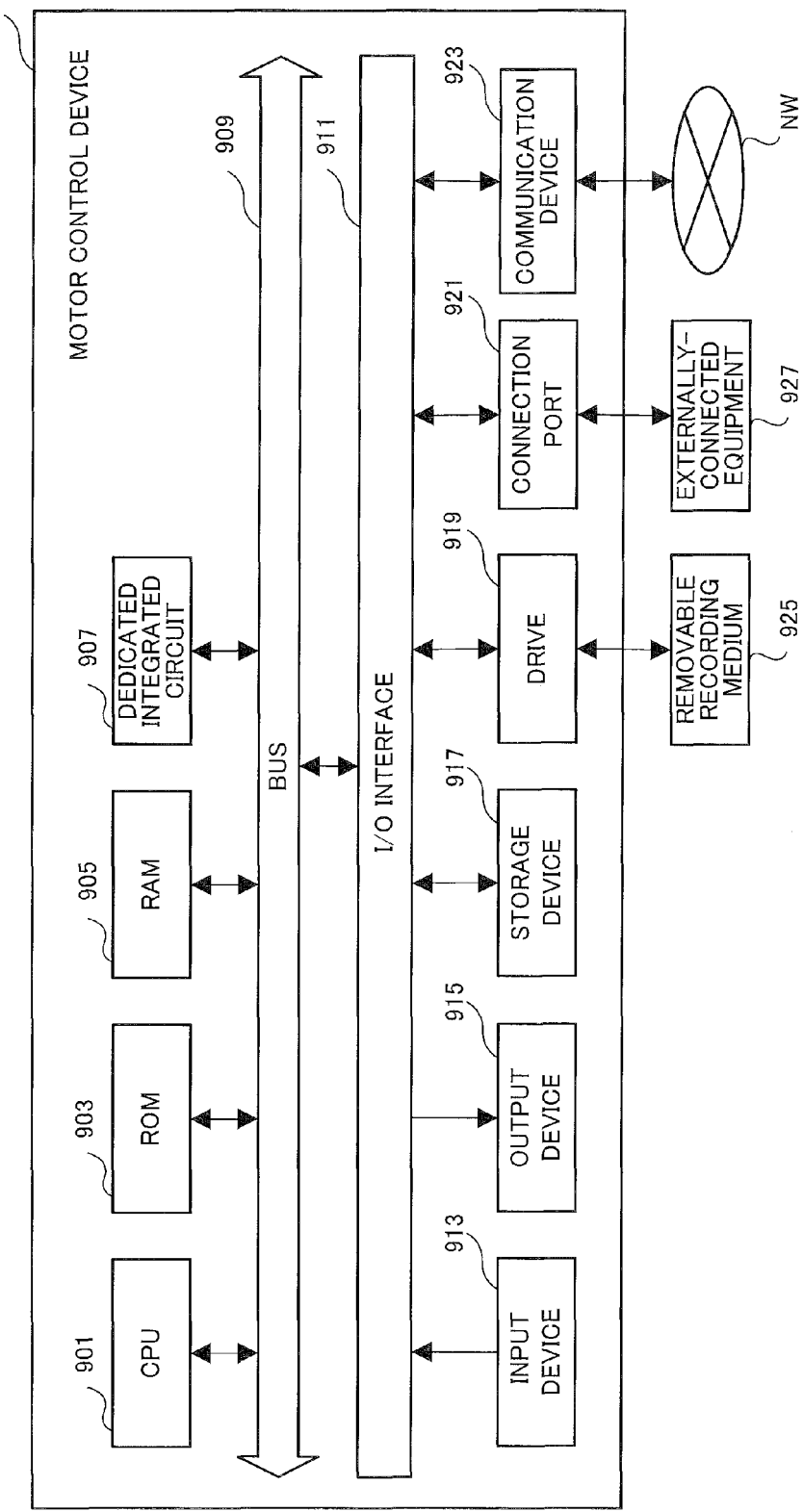
FIG. 9 is an explanatory view of an example of a hardware configuration of the motor control device.

A hardware configuration example will be described for the motor control device 14 achieving the processes of the brake control part 24, the diagnosis part 26, etc implemented by a program executed by the CPU 901 described above, with reference to FIG. 9. In FIG. 9, a configuration related to a function of supplying a drive electric power to the motor M of the motor control device 14 is not shown.

As shown in FIG. 9, the motor control device 14 has, for example, a CPU 901, a ROM 903, a RAM 905, a dedicated integrated circuit 907 constructed for specific use such as an ASIC or an FPGA, an input device 913, an output device 915, a storage device 917, a drive 919, a connection port 921, and a communication device 923. These constituent elements are mutually connected via a bus 909 and an I/O interface 911 such that signals can be transferred.

The program can be recorded in a recording device such as the ROM 903, the RAM 905, and the storage device 917, for example.

The program can also temporarily or permanently be recorded in a removable recording medium 925 such as various optical disks including CDs, MO disks, and DVDs, and semiconductor memories. The removable recording medium 925 as described above can be provided as so-called packaged software. In this case, the program recorded in the removable recording medium 925 may be read by the drive 919 and recorded in the recording device through the I/O interface 911, the bus 909, etc.

The program may be recorded in, for example, a download site, another computer, or another recording medium (not shown). In this case, the program is transferred through a network NW such as a LAN and the Internet and the communication device 923 receives this program. The program received by the communication device 923 may be recorded in the recording device through the I/O interface 911, the bus 909, etc.

The program may be recorded in appropriate externally-connected equipment 927, for example. In this case, the program may be transferred through the appropriate connection port 921 and recorded in the recording device through the I/O interface 911, the bus 909, etc.

The CPU 901 executes various process in accordance with the program recorded in the recording device to implement the processes of the brake control part 24, the diagnosis part 26, etc. In this case, the CPU 901 may directly read and execute the program from the recording device or may be execute the program once loaded in the RAM 905. In the case that the CPU 901 receives the program through, for example, the communication device 923, the drive 919, or the connection port 921, the CPU 901 may directly execute the received program without recording in the recording device.

The CPU 901 may execute various processes based on a signal or information input from the input device 913 such as a mouse, a keyboard, and a microphone (not shown) as needed.

The CPU 901 may output a result of execution of the process from the output device 915 such as a display device and a sound output device, for example, and the CPU 901 may transmit this process result to the communication device 923 or the connection port 921 as needed or may record the process result into the recording device or the removable recording medium.

It is noted that terms "vertical," "parallel," "plane," etc. in the above description are not used in the exact meanings thereof. Specifically, these terms "vertical," "parallel," and "plane" allow tolerances and errors in design and manufacturing and have meanings of "substantially vertical," "substantially parallel," and "substantially plane."

It is noted that terms "same," "equal," "different," etc. in relation to a dimension and a size of the appearance in the above description are not used in the exact meaning thereof. Specifically, these terms "same," "equal," and "different" allow tolerances and errors in design and manufacturing and have meanings of "substantially the same," "substantially equal," and "substantially different."

However, when a value used as a predefined determination criterion or a delimiting value is described such as the threshold value Po (see the time charts of FIG. 5 etc.) and a reference value, the terms "same," "equal," "different," etc. used for such a description are different from the above definition and have the exact meanings.

In addition, techniques by the embodiment and each modified example may be appropriately combined and utilized in addition to the examples having already described above.

In addition to that, although exemplification is not performed one by one, the embodiment and each modified example are carried out by various changes being applied thereto without departing from the spirit of the present disclosure.

What is claimed is:

1. A brake diagnosis device comprising:
    a brake control part configured to actuate or release a brake of a motor with the brake;
    a diagnosis part configured to diagnose a presence or absence of an abnormality of the brake while the brake is actuated by the brake control part;
    a signal output part configured to output a signal related to a brake abnormality after the brake is released by the brake control part in a case that the diagnosis part diagnoses the brake as having an abnormality;
    a position detector configured to detect a motor position of the motor;
    a position control part configured to generate a velocity command based on a position command and a detection position input from the position detector; and
    a position command output part configured to output to the position control part a first position command for moving the motor position by a predetermined amount from a diagnosis start position when the diagnosis part diagnoses the presence or absence of an abnormality of the brake, and to output a second position command for returning the motor position to the diagnosis start position after a diagnosis by the diagnosis part.

2. The brake diagnosis device according to claim 1, wherein:
    the brake control part releases the brake when the diagnosis part diagnoses that the brake has an abnormality.

3. The brake diagnosis device according to claim 2, wherein:
    the diagnosis part includes:
        a calculation part configured to calculate, based on the detection position, a movement amount of the motor position from the diagnosis start position; and
        a determination part configured to compare the movement amount calculated by the calculation part with a threshold value and to determine the presence or absence of an abnormality of the brake.

4. The brake diagnosis device according to claim 3, wherein the position command output part outputs to the position control part the first position command while the brake is actuated by the brake control part.

5. The brake diagnosis device according to claim 4, further comprising:
   a speed control part configured to generate a torque command based on the velocity command and a detection speed based on the detection position; and
   a torque limitation part configured to start torque limitation for limiting a command torque of the torque command to a torque limitation value or less in a case that the position command output part starts outputting the first position command, and to cancel the torque limitation in a case that the position command output part stops outputting the first position command.

6. The brake diagnosis device according to claim 5, wherein:
   the position command output part stops the output of the first position command in a case that the diagnosis part diagnoses the brake as having an abnormality during output of the first position command.

7. The brake diagnosis device according to claim 6, wherein:
   after the output of the first position command is stopped and the brake control part releases the brake, the position command output part outputs to the position control part the second position command.

8. The brake diagnosis device according to claim 7, wherein:
   the signal output part outputs the signal related to a brake abnormality when the detection position reaches the diagnosis start position.

9. The brake diagnosis device according to claim 8, further comprising:
   a timer part configured to count a time elapsed from a time point of actuation of the brake by the brake control part, and
   the position command output part starts outputting the first position command when the timer part has counted the elapse of the first waiting time.

10. The brake diagnosis device according to claim 9, wherein:
   the timer part counts a time elapsed from a time point of release of the brake B by the brake control part, and
   the position command output part starts outputting the second position command when the timer part has counted the elapse of a second waiting time.

11. A brake diagnosis method comprising:
   actuating a brake of a motor with the brake;
   diagnosing a presence or absence of an abnormality of the brake in an actuated state of the brake;
   releasing the brake in a case that the brake is diagnosed as having an abnormality;
   outputting a signal related to a brake abnormality after release of the brake;
   detecting a motor position of the motor;
   generating a velocity command based on a position command and a detection position of the motor; and
   outputting a first position command for moving the motor position by a predetermined amount from a diagnosis start position when the presence or absence of an abnormality of the brake is diagnosed; and
   outputting a second position command for returning the motor position to the diagnosis start position after a diagnosis.

* * * * *